(12) United States Patent
Zheng et al.

(10) Patent No.: US 8,141,353 B2
(45) Date of Patent: Mar. 27, 2012

(54) EXHAUST GAS ADDITIVE/TREATMENT SYSTEM AND MIXER FOR USE THEREIN

(75) Inventors: Guanyu Zheng, Farmington, MI (US);
Yongyue Zhang, Ann Arbor, MI (US);
Jeremy D. Popovich, Clinton, MI (US);
Dervis A. Yetken, Ann Arbor, MI (US);
Adam J. Kotrba, Laingsburg, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 477 days.

(21) Appl. No.: 12/150,269

(22) Filed: Apr. 25, 2008

(65) Prior Publication Data

US 2009/0266064 A1 Oct. 29, 2009

(51) Int. Cl.
*F01N 1/00* (2006.01)
*F02K 1/00* (2006.01)
*B05B 7/06* (2006.01)
*B05B 1/14* (2006.01)
*B01F 5/06* (2006.01)

(52) U.S. Cl. ......... 60/324; 60/770; 239/432; 239/590.5; 366/336; 366/340

(58) Field of Classification Search .................. 60/286, 60/295, 303, 324, 748, 770; 123/527, 590; 55/391; 181/213; 239/432, 590, 590.5; 366/336–340; 415/185, 191, 208.2, 209.4, 415/210.1, 211.2
See application file for complete search history.

(56) References Cited

U.S. PATENT DOCUMENTS

| 1,152,381 | A |   | 8/1915 | Kenney |
| 2,754,097 | A | * | 7/1956 | Hjulian ..................... 239/428.5 |
| 5,431,893 | A |   | 7/1995 | Hug et al. |
| 5,601,792 | A |   | 2/1997 | Hug et al. |
| 5,685,281 | A | * | 11/1997 | Li ................................. 123/590 |
| 5,809,775 | A |   | 9/1998 | Tarabulski et al. |
| 5,968,464 | A |   | 10/1999 | Peter-Hoblyn et al. |
| 5,976,475 | A |   | 11/1999 | Peter-Hoblyn et al. |
| 6,063,350 | A |   | 5/2000 | Tarabulski et al. |
| 6,203,770 | B1 |   | 3/2001 | Peter-Hoblyn et al. |
| 6,293,097 | B1 |   | 9/2001 | Wu et al. |
| 6,361,754 | B1 |   | 3/2002 | Peter-Hoblyn et al. |
| 6,401,449 | B1 |   | 6/2002 | Hofmann et al. |
| 6,401,455 | B1 |   | 6/2002 | Mathes et al. |
| 6,536,420 | B1 | * | 3/2003 | Cheng .......................... 123/590 |

(Continued)

FOREIGN PATENT DOCUMENTS

DE 10 2007 012 790 A1 9/2008

(Continued)

OTHER PUBLICATIONS

Wall, Dictionary.com.*

(Continued)

*Primary Examiner* — Thomas Denion
*Assistant Examiner* — Audrey K Bradley
(74) *Attorney, Agent, or Firm* — Wood, Phillips, Katz, Clark & Mortimer

(57) ABSTRACT

An exhaust mixer (16) is provided for use in an engine exhaust system (10) downstream from an additive injector (14). The mixer (16) includes a first wall structure (20), and a second wall structure (22) carrying a set of mixer vanes (30), the second wall structure (22) being cone shaped and extending radially outwardly from the first wall structure (20).

17 Claims, 4 Drawing Sheets

U.S. PATENT DOCUMENTS

| | | |
|---|---|---|
| 6,550,250 B2 | 4/2003 | Mikkelsen et al. |
| 6,553,755 B2 | 4/2003 | Hofmann et al. |
| 6,680,037 B1 | 1/2004 | Allansson et al. |
| 6,713,031 B2 | 3/2004 | Harris et al. |
| 6,745,562 B2 * | 6/2004 | Berriman et al. ............... 60/324 |
| 6,871,491 B2 | 3/2005 | Breuer et al. |
| 6,878,359 B1 | 4/2005 | Mathes et al. |
| 6,892,529 B2 | 5/2005 | Duvinage et al. |
| 6,941,746 B2 | 9/2005 | Tarabulski et al. |
| 6,976,354 B2 | 12/2005 | Liu |
| 7,065,958 B2 | 6/2006 | Funk et al. |
| 7,090,810 B2 | 8/2006 | Sun et al. |
| 2002/0108368 A1 | 8/2002 | Hodgson |
| 2002/0110047 A1 | 8/2002 | Bruck et al. |
| 2002/0116916 A1 | 8/2002 | Hofmann et al. |
| 2002/0162322 A1 | 11/2002 | Ganzmann et al. |
| 2004/0068981 A1 | 4/2004 | Siefker et al. |
| 2005/0058593 A1 | 3/2005 | Viola et al. |
| 2006/0075745 A1 * | 4/2006 | Cummings ..................... 60/315 |
| 2006/0080953 A1 | 4/2006 | Maus et al. |
| 2006/0248881 A1 | 11/2006 | Yokota |
| 2007/0144158 A1 | 6/2007 | Girard et al. |
| 2007/0204751 A1 | 9/2007 | Wirth et al. |
| 2007/0245718 A1 | 10/2007 | Cheng et al. |
| 2008/0087013 A1 * | 4/2008 | Crawley et al. ................. 60/320 |

FOREIGN PATENT DOCUMENTS

| | | |
|---|---|---|
| EP | 555746 A1 * | 8/1993 |
| EP | 1 712 751 S2 | 10/2006 |
| FR | 1.152.871 | 2/1958 |

OTHER PUBLICATIONS

Jacob et al., Machine Translation of EP 555,746 A1, Aug. 18, 1993.*

* cited by examiner

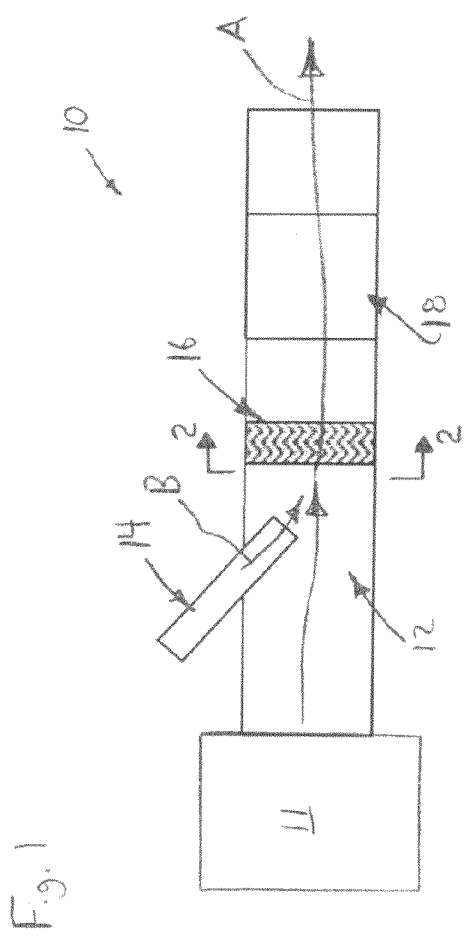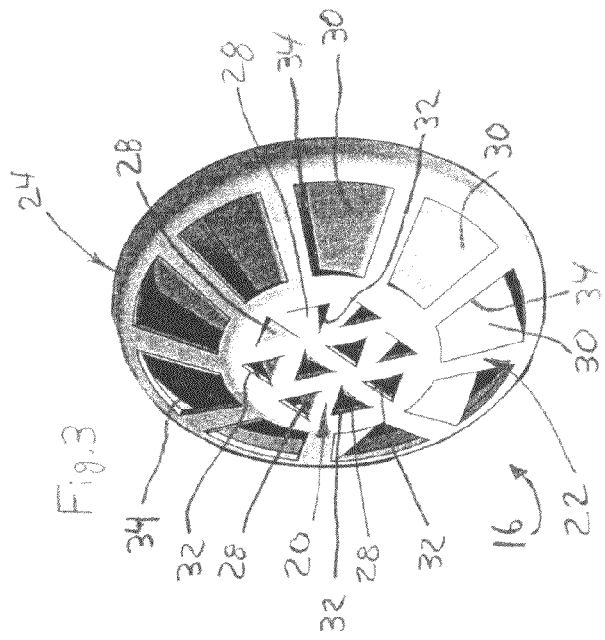

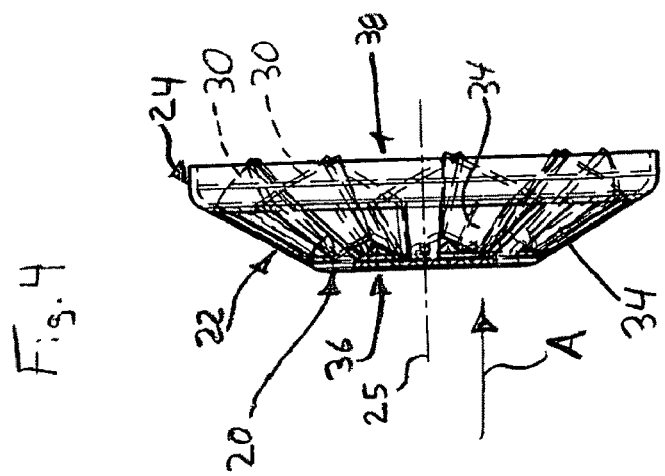
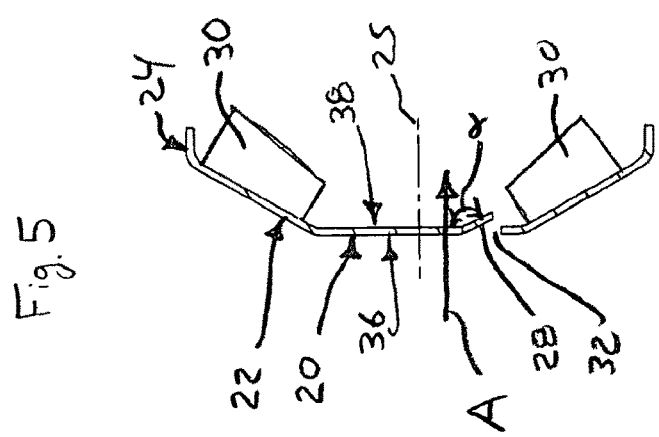
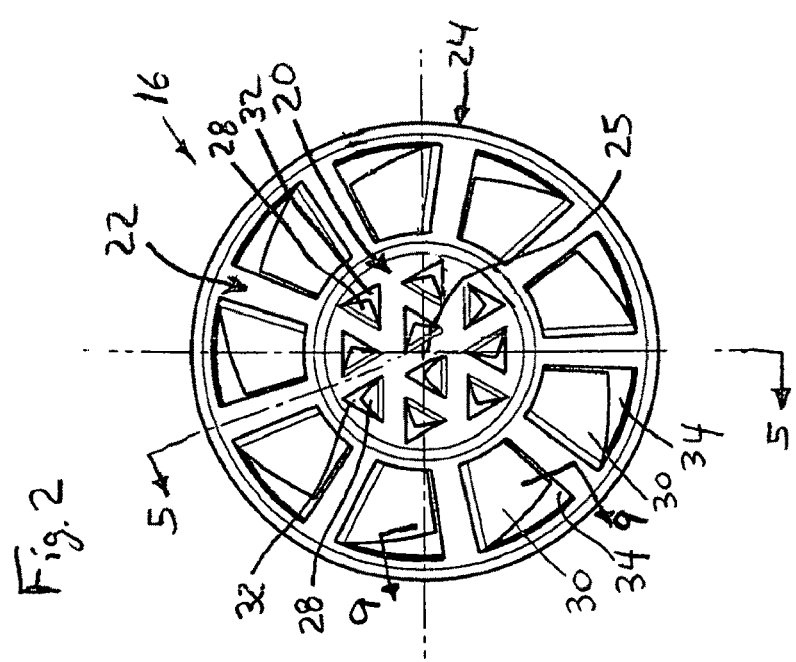

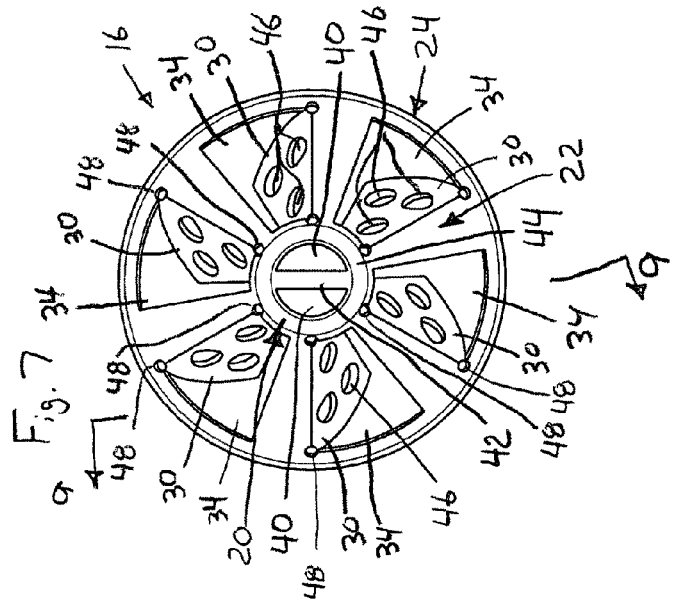
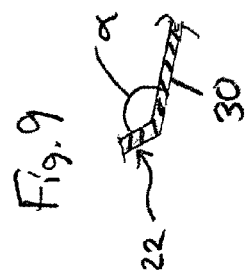
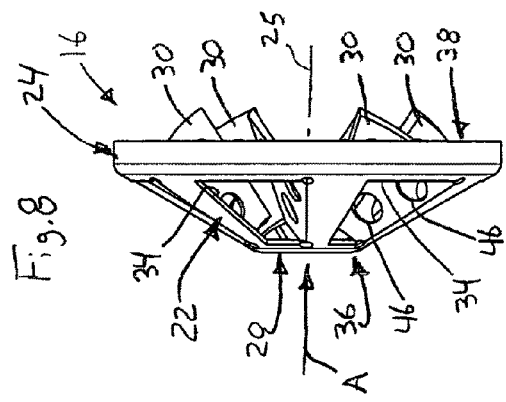
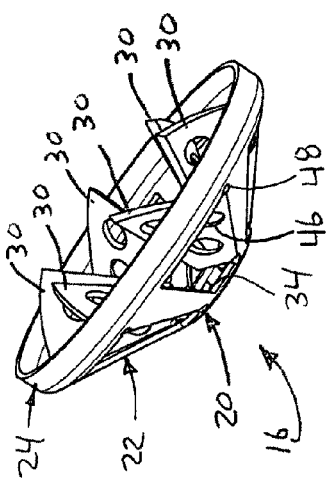

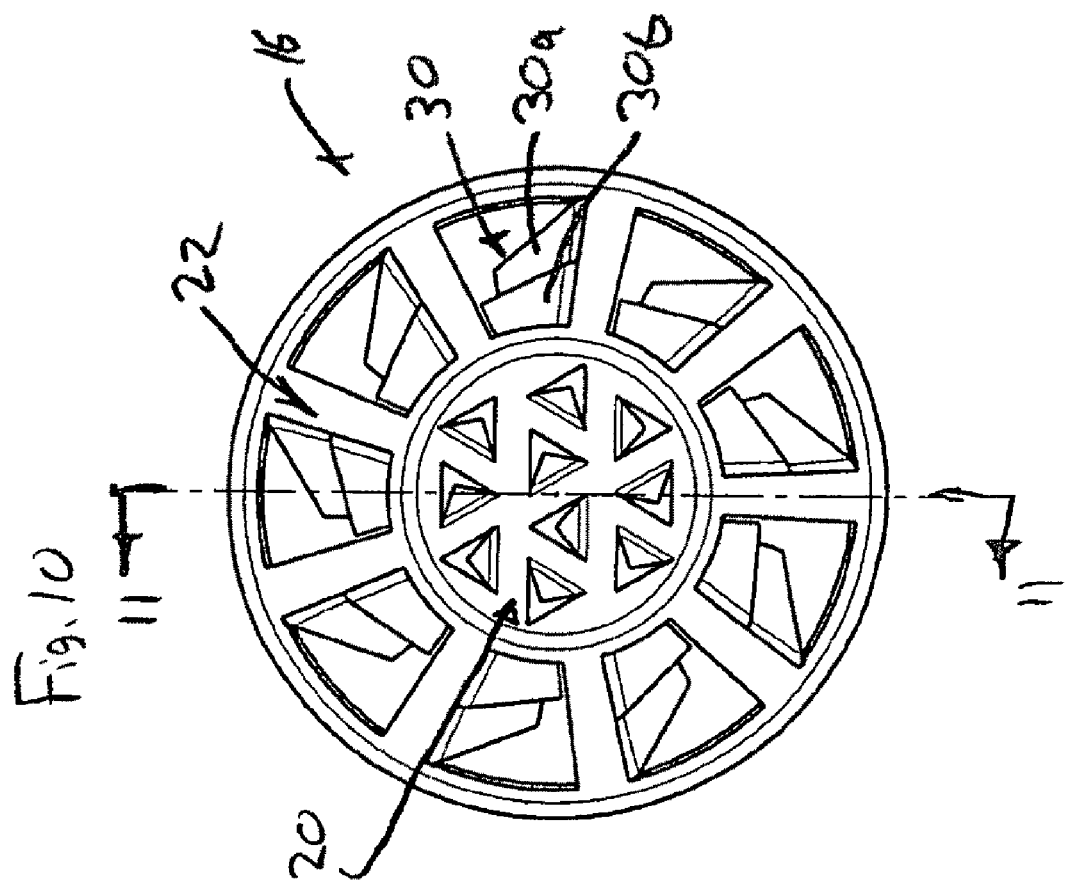
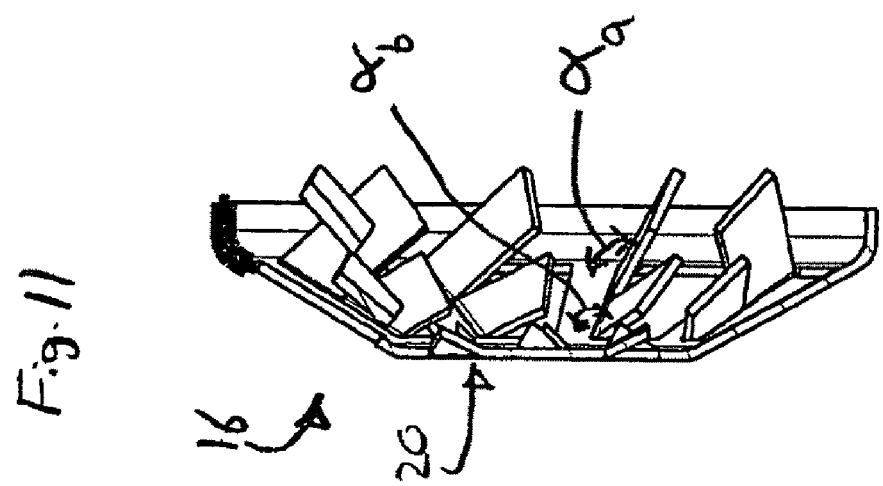

US 8,141,353 B2

EXHAUST GAS ADDITIVE/TREATMENT SYSTEM AND MIXER FOR USE THEREIN

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

BACKGROUND OF THE INVENTION

This invention relates to systems or devices that treat an exhaust gas or other gas stream by introducing one or more additives into the gas stream and for mixers used in such systems to mix the additive with the exhaust gas, often upstream of a catalyst.

It is known to treat exhaust gases or other gas streams by introducing one or more additives into the exhaust gas in order to enhance or create a catalytic reaction in a device downstream from the injection for the purpose of reducing undesirable emissions. In one known system, a reducing agent is injected into the exhaust gas of a diesel engine in order to reduce the amount of nitrogen oxides ($NO_x$) in the exhaust gas via catalytic reduction. In such systems, it is known for the additive to be provided in the form of ammonia or urea (dissolved in water) prior to the catalytic reaction. When this is done, it is important to obtain adequate mixing of the exhaust gas with the additive/reducing agent.

SUMMARY OF THE INVENTION

In accordance with the invention, an exhaust mixer is provided for use in an engine exhaust system downstream from an additive injector.

In accordance with one feature of the invention, the mixer includes a first wall structure, and a second wall structure carrying a set of mixer vanes, the second wall structure being cone shaped and extending radially outwardly from the first wall structure.

As one feature, each of the vanes of the set of mixer vanes is trapezoidal shaped.

In one feature, each of the vanes of the set of mixer vanes extends radially inwardly from the cone shaped wall structure.

According to one feature, the vanes of the set are perforate.

As one feature, the first wall structure carries an inner set of mixer vanes.

In one feature, the inner set of mixer vanes are of a different size than the set of mixer vanes carried on the second wall structure.

According to one feature, the inner set of mixer vanes are of a different shape than the set of mixer vanes carried on the second wall structure.

In one feature, the first wall structure has at least two openings passing therethrough.

As one feature, the at least two openings have no mixer vane structure associated therewith.

In one feature, the first wall structure is disc-shaped with two semicrescent shaped openings formed therein.

In accordance with one feature of the invention, the mixer includes a first set of mixer vanes having a first size and shape, and a second set of mixer vanes having a second size and shape and located radially outwardly from the first set of mixer vanes, the second size and shape being different from the first size and shape.

As one feature, the first set of mixer vanes are each triangular shaped.

In one feature, the second set of mixer vanes are each trapezoidal shaped.

According to one feature, the first size is less than half of the second size.

As one feature, the first set of mixer vanes is carried on a disc-shaped wall structure.

In one feature, the second set of mixer vanes is carried on a cone shaped wall structure.

In accordance with one feature of the invention, the mixer includes a first set of triangular shaped mixer vanes, and a second set of trapezoidal shaped mixer vanes spaced radially outwardly from the first set of vanes.

As one feature, the first set of mixer vanes are of a different size than the second set of mixer vanes.

In one feature, each of the mixer vanes of the first set are less than half the size of mixer vanes of the second set.

According to one feature, the first set of mixer vanes is carried on a disc-shaped wall structure.

As one feature, the second set of mixer vanes is carried on a cone shaped wall structure.

In accordance with one feature of the invention, a system is provided for treating an exhaust gas. The system includes an exhaust gas flow path, an additive injector located to introduce an additive into the exhaust gas flow path, and a mixer according to any of the above located in the exhaust gas flow path downstream from the injector. As a further feature, the system can include a catalyst in the exhaust gas flow path downstream from the injector.

Other objects, features, and advantages of the invention will become apparent from a review of the entire specification, including the appended claims and drawings.

DETAILED DESCRIPTION OF THE PREFERRED EMBODIMENT

Figure 1:
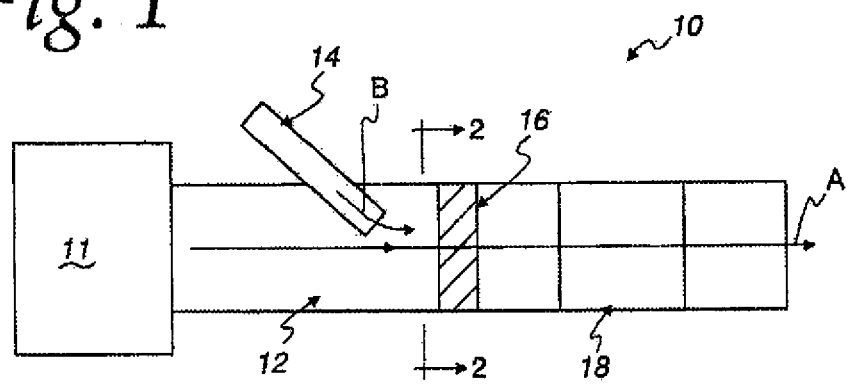
FIG. 1 is a diagrammatic representation of a system for treating an exhaust gas by introducing an additive into the exhaust gas upstream from a catalyst.
Figure 2:
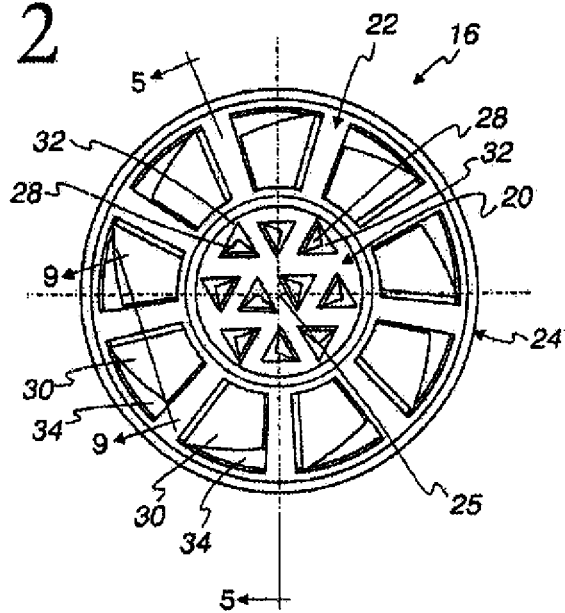
FIG. 2 is a view of a mixer component of FIG. 1 taken along lines 2-2 in FIG. 1.
Figure 3:
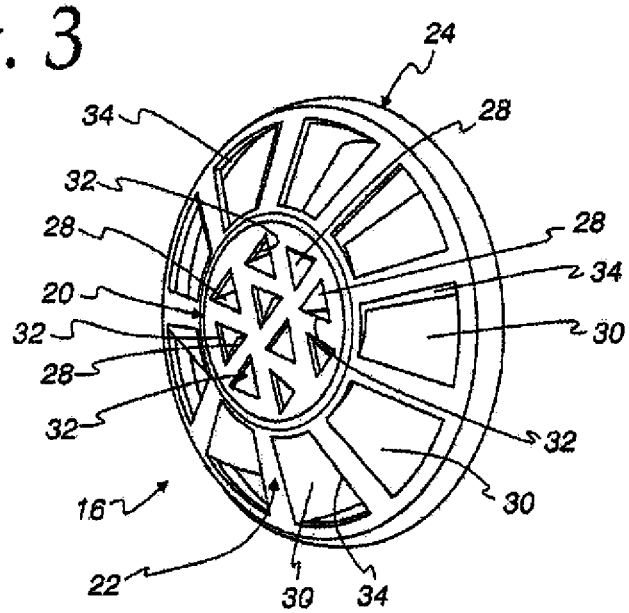
FIG. 3 is a perspective view of the mixer of FIG. 2.
Figure 4:
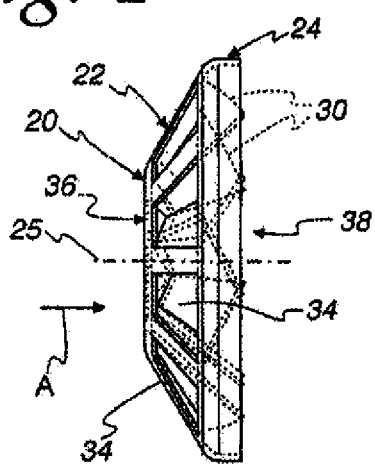
FIG. 4 is a side view of the component of FIG. 2 taken from line 4-4 in FIG. 2.

With reference to FIG. 1, a system 10 is shown for treating an exhaust gas stream, shown schematically by arrow A, from an engine or other exhaust gas producing device 11. The system 10 includes a flow path 12, one or more additive injectors 14, a mixer 16, and an after treatment element or zone in the form of an selective catalytic reduction (SCR) catalyst 18. The flow path 12 may be provided in any suitable form, and typically will be provided in the form of an exhaust duct or pipe and/or a housing for the catalyst 18, and may be combined or integrated with other exhaust gas treatment structures, such as, for example, a muffler or particulate filter. The additive injector(s) 14 may also be of any suitable form, many which are known, and in the illustrated embodiment preferably injects a reagent solution (typically a urea solution), shown schematically by arrow B, into a diesel exhaust gas stream A upstream of the mixer 16 and the catalyst 18.

With reference to FIG. 2-5, the mixer 16 includes a disc-shaped wall structure or nose 20 and a cone shaped wall structure 22 extending radially outward from the wall structure 20 to an annular flange 24, with all of the features 20, 22, 24 being concentric about a central axis 25 and the flange 24 being sized to engage a cylindrical interior wall surface of the flow path 12. A first set (ten in the illustrated embodiment) of mixer vanes 28 is carried on the wall structure 20 and a second set (nine in the illustrated embodiment) of mixer vanes 30 is carried on the wall structure 22. Each of the vanes 28 has a corresponding opening 32, and each of the vanes 30 has a corresponding opening 34. While any suitable construction may be used, preferably, the mixer 16 is a unitary component formed from a stamped piece of metal, with the mixer vanes 28 and 30 being formed by cutting the periphery of each vane 28, 30 to simultaneously form the corresponding openings 32 and 34, with the vanes 28, 30 then being bent away from an upstream side 36 of the mixer 16 towards a downstream side 38 of the mixer 16.

Preferably, the size and shape of the first set of mixer vanes 28 is different than the size and shape of the second set of mixer vanes 30. In this regard, in the illustrated embodiment, it can be seen that the first set of mixer vanes 28 are triangular shaped, and the second set of mixer vanes 30 are trapezoidal shaped, with the size of the first set of mixer vanes 28 being less than one fourth the size of the second set of mixer vanes 30. The mixer vanes 28 are preferably arranged to provide maximum density by taking advantage of their triangular shape while retaining an adequate amount of the wall structure 20 between the opening 32 to maintain structural integrity over the intended life of the mixer 16. The mixer vanes 30 are preferably arranged in a circumferential array while retaining an adequate amount of the wall structure 22 to maintain structural integrity over the intended life of the mixer 16.

Testing has shown that the wall structure 20, vanes 28, and openings 32 tend to atomize and/or vaporize the additive and that the wall structure 22, vanes 30, and openings 34 tend to swirl the combined exhaust gas/additive flow, with both phenomenons combining to provide enhanced mixing and superior reduction efficiency from the system 10 in comparison to more conventional mixers.

Figure 6:
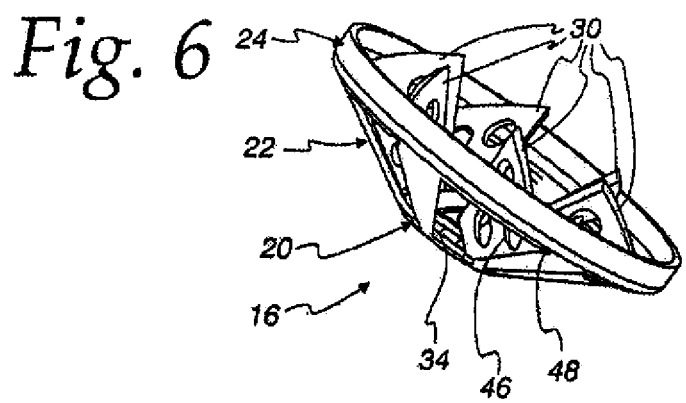
FIG. 6 is a perspective view of an alternate embodiment of the mixer component of FIG. 1.
Figure 7:
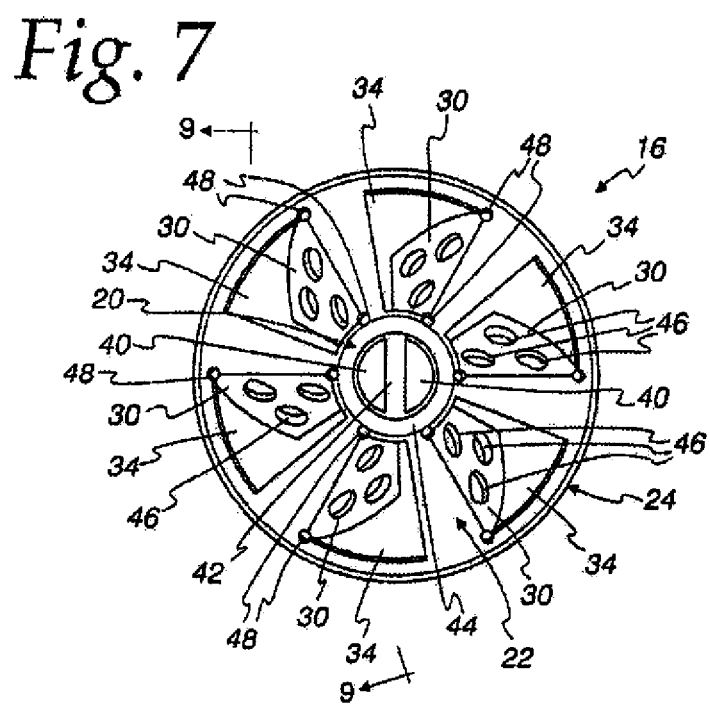
FIG. 7 is a plan view of the mixer of FIG. 6.
Figure 8:
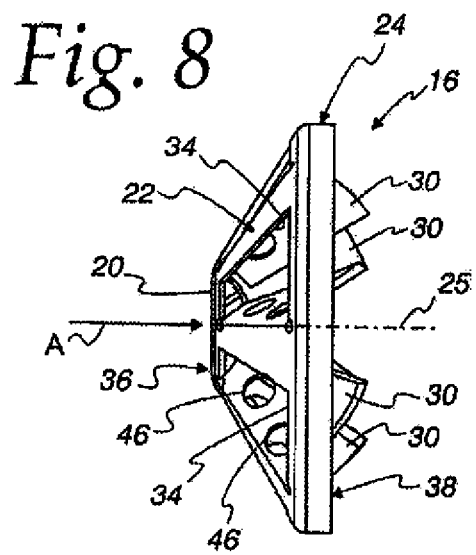
FIG. 8 is a side view of the mixer component of FIG. 6.

With reference to the alternate embodiment of the mixer 16 shown in FIGS. 6-8, it can be seen that the diameter of the disc-shaped wall structure 20 has been reduced which a corresponding increase in the size of the coned shape wall structure 22, and that the vanes 28 have been eliminated and replaced with two half-crescent shaped openings 40 separated by an elongate, rectangular shaped portion 42 of the wall structure 22 and surrounded by a ring shaped portion 44 of the wall structure 22. The size of the each of the vanes 30 has been increased by an amount corresponding to the size increase of the wall structure 22, and the number of vanes has been reduced from nine down to six. In this regard, it is important to note that the number of vanes 30 will be highly dependent upon the particular parameters of each application, including the internal diameter or dimension of the flow path 12, the desired back pressure, and the desired amount of mixing. Preferably, each of the vanes 30 includes an array of perforations 46, which are shown as circular openings in FIGS. 6-8, which are intended to enhance mixing of the additive and the exhaust gas. Stress reliefs 48 are preferably provided at each end of the side of each vane 30 that connects with the wall structure 22.

Figure 5:
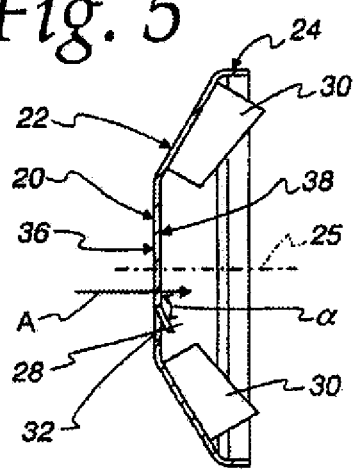
FIG. 5 is a section view taken generally along line 5-5 in FIG. 2.
Figure 9:
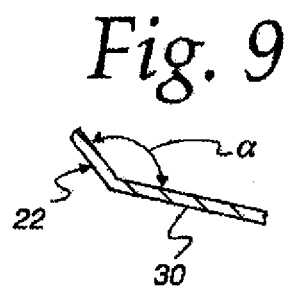
FIG. 9 is a partial section view taken from any of lines 9-9 in FIGS. 2 and 7.
Figure 10:
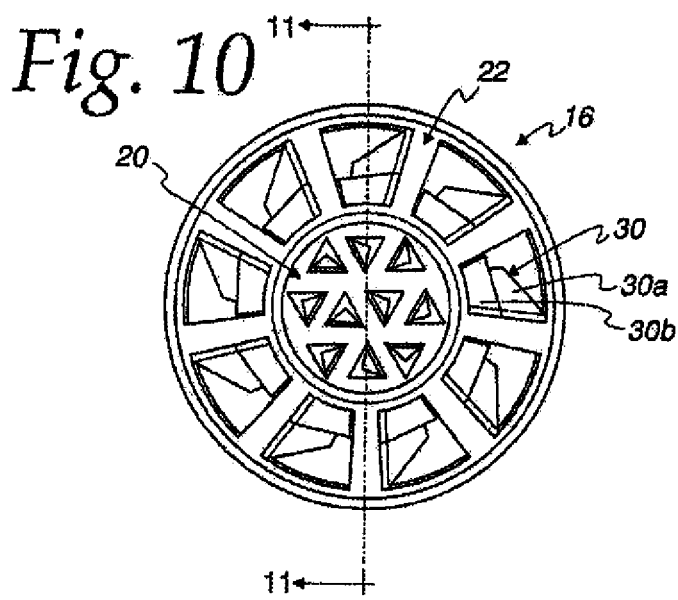
FIG. 10 is a plan view of an alternate embodiment of the mixer component of FIG. 1.
Figure 11:
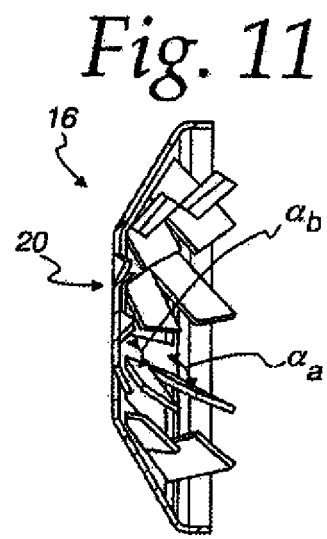
FIG. 11 is a section view taken along line 11-11 in FIG. 10.

As best seen in FIGS. 5 and 9, for both embodiments of the mixer 16, the vanes 28 and 30 have a bend angle α (angle of intersection) that can range from 15° to 90° with respect to the associated wall structure 20 or 22. Again, the particular bend angle will be highly dependent upon the particular parameters of each application, including for example, the desired back pressure and the amount of mixing. Furthermore, as seen in FIGS. 10 and 11, it is also possible to split one or more of the vanes 30 along its radial length to form subvanes 30*a* and 30*b*, with one of the vanes 30*a* having a first bend angle $\alpha_a$ and the other of the vanes 30*b* having a bend angle $\alpha_b$ that is different from the bend angle $\alpha_a$ in order to further enhance mixing.

It should be understood that while preferred embodiments of the mixer 16 have been shown herein, there are many possible modifications that may be desirable depending upon the particular parameters of each application. For example, other shapes, orientations, numbers, arrangements, sizes, and relative sizes may be desirable for either or both of sets of vanes 28 and 30, an example of which is shown by the differences between the vanes 30 in FIGS. 2-5 and the vanes 30 in FIGS. 6-8. In this regard, it should be understood that the perforations 46 may be desirable in the vanes 30 of FIGS. 2-5 for some applications, and it may be desirable to eliminate the perforations 44 from the vanes 30 in the embodiment of FIGS. 6-8 for some applications. Similarly, the stress reliefs 48 can be provided with any of the vanes 28 and 30 in either embodiment, or can be eliminated, as dictated by the requirements of each application. By way of further example, it may be desirable for cone angle of the wall structure 22 to be either steeper or shallower than shown in the embodiments of FIGS. 2-8 for some applications. Similarly, the size of the wall structure 20 can be changed based on the parameters of any particular application.

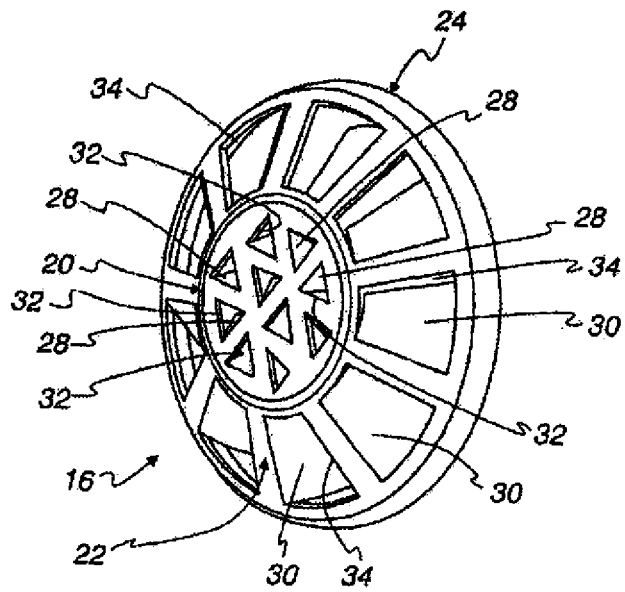

The invention claimed is:

1. An exhaust mixer for use in an engine exhaust system downstream from an additive injector, the mixer comprising:
   a first disc-shaped wall structure with a plurality of flow openings formed therein; and
   a second wall structure carrying a set of mixer vanes, the second wall structure having a cone shape extending radially outwardly from and intersecting the first wall structure such that the first wall structure truncates the cone shape.

2. The mixer of claim 1 wherein each of the vanes of the set of mixer vanes is trapezoidal shaped.

3. The mixer of claim 1 wherein each of the vanes of the set of mixer vanes extends radially inwardly from the cone shaped wall structure.

4. The mixer of claim 1 wherein the first wall structure has two semicresent shaped openings formed therein.

5. The mixer of claim 1 wherein the first wall structure has at least two openings passing therethrough.

6. The mixer of claim 5 wherein the at least two openings have no mixer vane structure associated therewith.

7. An exhaust mixer for use in an engine exhaust system downstream from an additive injector, the mixer comprising:

a first disc-shaped wall structure with a plurality of flow openings formed therein;

a second wall structure carrying a set of mixer vanes, the second wall structure being cone shaped and extending radially outwardly from of the first wall structure; and wherein the vanes of the set are perforate.

8. An exhaust mixer for use in an engine exhaust system downstream from an additive injector, the mixer comprising:

a first disc-shaped wall structure with a plurality of flow openings formed therein;

a second wall structure carrying a set of mixer vanes, the second wall structure being cone shaped and extending radially outwardly from of the first wall structure; and wherein the first wall structure carries an inner set of mixer vanes.

9. The mixer of claim 8 wherein the inner set of mixer vanes are of a different size than the set of mixer vanes carried on the second wall structure.

10. The mixer of claim 8 wherein the inner set of mixer vanes are of a different shape than the set of mixer vanes carried on the second wall structure.

11. An exhaust mixer for use in an engine exhaust system downstream from an additive injector, the mixer comprising:

a first set of mixer vanes having a first size and shape; and a second set of mixer vanes having a second size and shape and located radially outwardly from the first set of mixer vanes the second size and shape being different from the first size and shape, wherein the first set of mixer vanes is carried on a disc-shaped wall structure, wherein the second set of mixer vanes is carried on a cone shaped wall structure.

12. The mixer of claim 11 wherein the first set of mixer vanes are each triangular shaped.

13. The mixer of claim 11 wherein the second set of mixer vanes are each trapezoidal shaped.

14. An exhaust mixer for use in an engine exhaust system downstream from an additive injector, the mixer comprising:

a first set of triangular shaped mixer vanes; and a second set of trapezoidal shaped mixer vanes spaced radially outwardly from the first set of vanes, wherein the first set of mixer vanes is carried on a disc-shaped wall structure, wherein the second set of mixer vanes is carried on a cone shaped wall structure.

15. The mixer of claim 14 wherein the first set of mixer vanes are of a different size than the second set of mixer vanes.

16. The mixer of claim 14 wherein each of the mixer vanes of the first set are less than half the size of mixer vanes of the second set.

17. An exhaust mixer for use in an engine exhaust system downstream from an additive injector, the mixer comprising:

a first disc-shaped wall structure with a plurality of flow openings formed therein;

a second wall structure carrying a set of mixer vanes, the second wall structure being cone shaped and extending radially outwardly from of the first wall structure; and wherein at least one of the vanes of the set of mixer vanes is divided to form at least a pair of subvanes, each of the subvanes having a different angle of intersection with the second wall structure from the other of the subvanes.

\* \* \* \* \*

UNITED STATES PATENT AND TRADEMARK OFFICE
CERTIFICATE OF CORRECTION

| | |
|---|---|
| PATENT NO. | : 8,141,353 B2 |
| APPLICATION NO. | : 12/150269 |
| DATED | : March 27, 2012 |
| INVENTOR(S) | : Guanyu Zheng et al. |

It is certified that error appears in the above-identified patent and that said Letters Patent is hereby corrected as shown below:

On the Title Page – 4th Inventor name corrected to read

Item (75)   Inventors: Guanyu Zheng, Farmington, MI (US);
Yongyue Zhang, Ann Arbor, MI (US);
Jeremy D. Popovich, Clinton, MI (US);
Dervis A. Yetkin, Ann Arbor, MI (US);
Adam J. Kotrba, Laingsburg, MI (US)

AND

In the Drawings:

Please substitute the replacement drawings for FIGS. 1-11, copies of which are attached.

Signed and Sealed this
Eighteenth Day of June, 2013

Teresa Stanek Rea
*Acting Director of the United States Patent and Trademark Office*

(12) United States Patent
Zheng et al.

(10) Patent No.: US 8,141,353 B2
(45) Date of Patent: Mar. 27, 2012

(54) EXHAUST GAS ADDITIVE/TREATMENT SYSTEM AND MIXER FOR USE THEREIN

(75) Inventors: Guanyu Zheng, Farmington, MI (US); Yongyue Zhang, Ann Arbor, MI (US); Jeremy D. Popovich, Clinton, MI (US); Dervis A. Yetken, Ann Arbor, MI (US); Adam J. Kotrba, Laingsburg, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 477 days.

(21) Appl. No.: 12/150,269

(22) Filed: Apr. 25, 2008

(65) Prior Publication Data
US 2009/0266064 A1    Oct. 29, 2009

(51) Int. Cl.
F01N 1/00    (2006.01)
F02K 1/00    (2006.01)
B05B 7/06    (2006.01)
B05B 1/14    (2006.01)
B01F 5/06    (2006.01)

(52) U.S. Cl. ......... 60/324; 60/770; 239/432; 239/590.5; 366/336; 366/340

(58) Field of Classification Search ............ 60/286, 60/295, 303, 324, 748, 770; 123/527, 590, 55/391; 181/213; 239/432, 590, 590.5; 366/336–340; 415/185, 191, 208.2, 209.4, 415/210.1, 211.2
See application file for complete search history.

(56) References Cited

U.S. PATENT DOCUMENTS

| | | | |
|---|---|---|---|
| 1,152,381 A | 8/1915 | Kenney | |
| 2,754,097 A * | 7/1956 | Hjulian | 239/428.5 |
| 5,431,893 A | 7/1995 | Hug et al. | |
| 5,601,792 A | 2/1997 | Hug et al. | |
| 5,685,281 A * | 11/1997 | Li | 123/590 |
| 5,809,775 A | 9/1998 | Tarabulski et al. | |
| 5,968,464 A | 10/1999 | Peter-Hoblyn et al. | |
| 5,976,475 A | 11/1999 | Peter-Hoblyn et al. | |
| 6,063,350 A | 5/2000 | Tarabulski et al. | |
| 6,203,770 B1 | 3/2001 | Peter-Hoblyn et al. | |
| 6,293,097 B1 | 9/2001 | Wu et al. | |
| 6,361,754 B1 | 3/2002 | Peter-Hoblyn et al. | |
| 6,401,449 B1 | 6/2002 | Hofmann et al. | |
| 6,401,455 B1 | 6/2002 | Mathes et al. | |
| 6,536,420 B1 * | 3/2003 | Cheng | 123/590 |

(Continued)

FOREIGN PATENT DOCUMENTS

DE    10 2007 012 790 A1    9/2008

(Continued)

OTHER PUBLICATIONS

Wall, Dictionary.com.*

(Continued)

Primary Examiner — Thomas Denion
Assistant Examiner — Audrey K Bradley
(74) Attorney, Agent, or Firm — Wood, Phillips, Katz, Clark & Mortimer

(57) ABSTRACT

An exhaust mixer (16) is provided for use in an engine exhaust system (10) downstream from an additive injector (14). The mixer (16) includes a first wall structure (20), and a second wall structure (22) carrying a set of mixer vanes (30), the second wall structure (22) being cone shaped and extending radially outwardly from the first wall structure (20).

17 Claims, 4 Drawing Sheets